United States Patent
Kiyoshima et al.

(10) Patent No.: US 8,965,437 B2
(45) Date of Patent: Feb. 24, 2015

(54) BASE STATION AND METHOD

(75) Inventors: Kohei Kiyoshima, Tokyo (JP); Hiroyuki Ishii, Tokyo (JP); Yoshitaka Hiramoto, Tokyo (JP); Naoki Nakaminami, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 169 days.

(21) Appl. No.: 13/878,350

(22) PCT Filed: Sep. 30, 2011

(86) PCT No.: PCT/JP2011/072620
§ 371 (c)(1),
(2), (4) Date: Apr. 8, 2013

(87) PCT Pub. No.: WO2012/046657
PCT Pub. Date: Apr. 12, 2012

(65) Prior Publication Data
US 2013/0210341 A1   Aug. 15, 2013

(30) Foreign Application Priority Data
Oct. 8, 2010   (JP) ................................. 2010-228872

(51) Int. Cl.
*H04B 7/00* (2006.01)
*H04W 52/24* (2009.01)
*H04W 52/12* (2009.01)
(Continued)

(52) U.S. Cl.
CPC ............ *H04W 52/241* (2013.01); *H04W 52/12* (2013.01); *H04W 52/248* (2013.01); *H04W 16/26* (2013.01); *H04W 52/146* (2013.01); *H04W 52/242* (2013.01)

USPC ................ 455/509; 455/7; 455/11.1; 455/15; 455/16; 455/41.2

(58) Field of Classification Search
CPC ............................. H04W 16/26; H04W 52/146
USPC ......................... 455/509, 7, 11.1, 15, 16, 41.2
See application file for complete search history.

(56) References Cited

U.S. PATENT DOCUMENTS 4,553,247 A * 11/1985 Harris ........................... 375/214
6,222,503 B1 * 4/2001 Gietema et al. ............... 343/890
(Continued)

OTHER PUBLICATIONS

International Search Report issued in PCT/JP2011/072620 mailed Dec. 27, 2011 (2 pages).

(Continued)

*Primary Examiner* — Sanh Phu
(74) *Attorney, Agent, or Firm* — Osha Liang LLP

(57) ABSTRACT

A base station includes a determination unit that determines whether user equipment performs radio communication through a booster, based on delay time of a signal transmitted to and received from the user equipment; a target SIR setting unit that sets a target SIR to be compared to a received SIR for performing transmission power control based on the received SIR of an uplink signal from the user equipment; a transmission power control signal generating unit that generates, based on the target SIR and the received SIR, a transmission power control signal to be set for controlling transmission power of the user equipment; and a transmitter that transmits the transmission power control signal to the user equipment. When determination is made that the radio communication is performed through the booster, the target SIR is set to be less than or equal to a predetermined upper limit value.

11 Claims, 9 Drawing Sheets

(51) Int. Cl.
*H04W 16/26* (2009.01)
*H04W 52/14* (2009.01)

(56) References Cited

U.S. PATENT DOCUMENTS

| | | | |
|---|---|---|---|
| 8,023,885 B2 * | 9/2011 | Proctor et al. | 455/7 |
| 2009/0325481 A1 * | 12/2009 | Mohebbi | 455/15 |
| 2010/0074193 A1 * | 3/2010 | Chaponniere | 370/329 |
| 2011/0053497 A1 * | 3/2011 | Kawasaki | 455/9 |

OTHER PUBLICATIONS

3GPP TS 36.213 V9.2.0; "3rd Generation Partnership Project; Technical Specification Group Radio Access Network; Evolved Universal Terrestrial Radio Access (E-UTRA); Physical layer Procedures (Release 9)"; Jun. 2010 (80 pages).

Written Opinion issued in PCT/JP2011/072620 mailed Dec. 27, 2011 (4 pages).

* cited by examiner

FIG.6

| DELAY TIME PERIOD CLASSIFICATION VALUE | |
|---|---|
| ~$Delay_1$ | $SIR_{MAX0}$ / $RB_{MAX0}$ |
| $Delay_1$~$Delay_2$ | $SIR_{MAX1}$ / $RB_{MAX1}$ |
| : | : |
| $Delay_N$~ | $SIR_{MAXN}$ / $RB_{MAXN}$ |

FIG.9

| DELAY TIME PERIOD CLASSIFICATION VALUE | PATH-LOSS CLASSIFICATION VALUE | | | | |
|---|---|---|---|---|---|
| | ~Pathloss$_1$ | Pathloss$_1$~Pathloss$_2$ | ... | Pathloss$_M$~ |
| ~Delay$_1$ | SIR$_{MAX00}$ / RB$_{MAX00}$ | SIR$_{MAX01}$ / RB$_{MAX01}$ | ... | SIR$_{MAX0M}$ / RB$_{MAX0M}$ |
| Delay$_1$~Delay$_2$ | SIR$_{MAX10}$ / RB$_{MAX10}$ | SIR$_{MAX11}$ / RB$_{MAX11}$ | ... | SIR$_{MAX1M}$ / RB$_{MAX1M}$ |
| .. | .. | .. | .. | .. |
| Delay$_N$~ | SIR$_{MAXN0}$ / RB$_{MAXN0}$ | SIR$_{MAXN1}$ / RB$_{MAXN1}$ | ... | SIR$_{MAXNM}$ / RB$_{MAXNM}$ |

BASE STATION AND METHOD

TECHNICAL FIELD

The present invention relates to a radio communication system.

BACKGROUND ART

Technical specifications of Long Term Evolution (LTE) have been developed by the 3rd Generation Partnership Project (3GPP), which is the standardization organization of the Wideband-Code Division Multiple Access (W-CDMA). LTE is a standard that is further evolved from the High Speed Packet Access (HSPA), which is evolved technology of the W-CDMA. LTE provides high-speed communication where a downlink transmission rate of 100 Mbps or more is achieved and an uplink transmission rate of 50 Mbps or more is achieved. LTE improves latency and spectral efficiency.

For LTE, transmission power control (TPC: transmission power control) may be performed in a manner such that, as a path loss becomes smaller, a received Signal to Interference Ratio (SIR) becomes greater. Such power control is referred to as "Fractional power control (Fractional TCP)."

Additionally, for LTE, it is expected that closed loop transmission power control is utilized together with open loop transmission power control.

When the open loop transmission power control is performed, user equipment measures the path loss based on a downlink signal from a base station (eNodeB), such as a downlink reference signal. The user equipment determines transmission power based on the path loss.

When the closed loop transmission power control is performed, a base station (eNodeB) estimates a path loss based on an uplink signal. Depending on the path loss, the base station (eNodeB) sets a target SIR. The base station (eNodeB) measures a received SIR based on an uplink signal from the user equipment. The base station (eNodeB) controls the transmission power so that the received SIR becomes equal to the target SIR. Specifically, the base station (eNodeB) transmits a transmission power control command (TPC Command).

The transmission power control command indicates that the transmission power is to be increased or to be decreased.

RELATED ART DOCUMENT

[Non-Patent Document]
 Non-patent document 1: TS36.213 V9.2.0 2010 06

SUMMARY OF THE INVENTION

Problem to be Solved by the Invention

For LTE, utilization of boosters is considered, in order to reduce blind zones. The blind zones can be reduced by economically reforming weak electric field areas to be communication areas. A booster is a device that receives a radio signal between a base station (eNodeB) and user equipment, and that reemits the received signal while amplifying the received signal. Specifically, a booster receives and amplifies a downlink signal, and transmits the downlink signal to user equipment. Additionally, the booster receives and amplifies an uplink signal from the user equipment, and transmits the uplink signal to a base station (eNodeB).

When a downlink signal from a base station (eNodeB) is received by user equipment through a booster, a path loss is measured to be smaller by an amount corresponding to a gain which is added by the booster (hereinafter, which is referred to as the "booster gain"), compared to a case where the signal is received without passing though the booster. Similarly, when an uplink signal from the user equipment is received by the base station (eNodeB) through the booster, the path loss is measured to be smaller by the amount corresponding to the booster gain, compared to a case where the signal is received without passing though the booster.

FIG. 1 shows a problem that may occur when the base station (eNodeB) and the user equipment communicate with each other through the booster.

For a case of without passing through the booster, the path loss measured by the base station (eNodeB) is L0. The path loss is measured by the base station (eNodeB), for example, based on an uplink signal transmitted from the user equipment.

When a downlink signal from the base station (eNodeB) is received by the user equipment through the booster, the path loss is measured to be smaller by the amount of the booster gain, compared to the case of without passing through the booster.

The uplink is explained below.

For example, for a case where an uplink signal transmitted from the user equipment is received by the booster, the path loss to be measured by the booster is assumed to be L2. Further, for a case where an uplink signal transmitted from the booster is received by the base station (eNodeB), the path loss to be measured by the base station (eNodeB) is assumed to be L1. For a case without amplification by the booster, L0=L1+L2. Suppose that the booster gain is G dB. For a case where the uplink signal transmitted from the user equipment is amplified by the booster and the uplink signal is received by the base station (eNodeB), the path loss to be measured by the base station (eNodeB) is L1+L2−G.

Accordingly, when the path loss (L2) between the booster and the user equipment is less than or equal to the booster gain G, the path loss to be measured by the base station (eNodeB) becomes less than or equal to L1. Since the base station (eNodeB) sets the target SIR depending on the path loss, when the path loss is small, the target SIR is set to be a large value. Since the target SIR is set to be the large value, in many cases, a TPC command is transmitted to the user equipment, where the TPC command indicates that the transmission power is to be increased. That is because the base station (eNodeB) adjusts the transmission power based on the target SIR and the received SIR, where the received SIR is measured based on the uplink signal from the user equipment. The user equipment transmits the uplink signal while increasing the transmission power in accordance with the TPC command from the base station (eNodeB). The uplink signal is received and amplified by the booster. Then the uplink signal is transmitted to the base station (eNodeB). The transmission power is adjusted based on the target SIR. As a result that the target SIR is set to be the large value by the base station (eNodeB), the user equipment may continue increasing the transmission power. When the user equipment continues increasing the transmission power, the booster may continue increasing the output power in accordance with the transmission power, to some extent. However, there is a limit for the transmission output power of the booster. Accordingly, there is a case where the transmission output power may not be increased in accordance with the uplink signal, even if the uplink signal transmitted from the user equipment is such that the output power would exceed the limit for the transmission output power of the booster. Since the booster cannot increase the transmission output power, the base station (eNodeB) transmits a TPC command indicating that the transmission power is to be further increased. Due to the limit of the transmission output power of the booster, the booster cannot increase the transmission output power, even if the user equipment increases the transmission power in accordance with the TPC command. In the base station (eNodeB), the control is repeated, which is for transmitting the TPC command indicating that the transmission power is to be further increased.

The downlink is explained below.

For example, for a case where a downlink signal transmitted from the base station (eNodeB) is received by the booster, a path loss to be measured by the booster is assumed to be L1. Further, for a case where the downlink signal transmitted from the booster is received by the user equipment, a path loss to be measured by the user equipment is assumed to be L2. Suppose that the booster gain is G dB. When the downlink signal transmitted from the base station (eNodeB) is received by the user equipment, a path loss measured by the user equipment is L1+L2−G.

Accordingly, when the path loss (L2) between the booster and the user equipment is less than or equal to the booster gain G, the path loss measured by the user equipment is less than or equal to L1. Since the user equipment sets the transmission power depending on the path loss, when the path loss is small, the user equipment transmits the uplink signal while increasing the transmission power. The uplink signal is received and amplified by the booster. Then the uplink signal is transmitted to the base station (eNodeB). In this case, when the user equipment continues increasing the transmission power, the booster may continue increasing the output power in accordance with the transmission power, to some extent. However, there is a limit for the uplink transmission output power of the booster. Accordingly, the transmission output power cannot be increased in accordance with the uplink signal, if the user equipment transmits the uplink signal such that the output power would exceed the limit for the transmission output power.

Operations are explained below. The operations may occur in the booster in the case where the uplink signal to be transmitted by the booster would exceed the transmission output power of the booster.

FIG. 2 shows an example of the operations in the case where the uplink signal to be transmitted by the booster would exceed the transmission output power of the booster.

For example, the booster may decrease the booster gain. By decreasing the booster gain, the transmission output power can be decreased. Thus a signal that would exceed the transmission output power can be prevented from being transmitted. When the booster gain is reduced, an area covered by the booster shrinks. When the booster is for multiple carriers, and the booster is performing amplification processes at the same gain, shrinking of areas for the multiple carriers may occur.

Alternatively, for example, the booster may shut down. Since transmission of the signal that would exceed the transmission output power is requested, the booster erroneously recognizes that it is a malfunction.

The present invention has been achieved in view of the above-described problem. An objective of the present invention is to reduce the cases where the uplink signal to be transmitted by the booster would exceed the transmission output power of the booster.

Means for Solving the Problem

According to one embodiment of the present invention, there is provided a base station (eNodeB) that performs radio communication with user equipment. The base station (eNodeB) includes a first determination unit that determines whether the user equipment is performing the radio communication through a booster, based on a delay time period of a signal transmitted to and received from the user equipment; a target SIR setting unit that sets a target SIR, wherein the target SIR is to be compared to a received SIR for performing transmission power control based on the received SIR of an uplink signal from the user equipment; a transmission power control signal generating unit that generates a transmission power control signal based on the target SIR and the received SIR, wherein the target SIR is set by the target SIR setting step, and the transmission power control signal is to be set for controlling transmission power of the user equipment; and a transmitter that transmits the transmission power control signal to the user equipment, the transmission power control signal being generated by the transmission power control signal generating unit. When the first determination unit determines that the user equipment is performing the radio communication through the booster, the target SIR setting unit sets the target SIR to be less than or equal to a predetermined upper limit value.

According to one embodiment, there is provided a method of a base station (eNodeB) that performs radio communication with user equipment. The method includes a first determination step of determining whether the user equipment is performing the radio communication through a booster, based on a delay time period of a signal transmitted to and received from the user equipment; a target SIR setting step of setting a target SIR, wherein the target SIR is to be compared to a received SIR for performing transmission power control based on the received SIR of an uplink signal from the user equipment; a transmission power control signal generating step of generating a transmission power control signal based on the target SIR and the received SIR, wherein the target SIR is set by the target SIR setting step, and the transmission power control signal is to be set for controlling transmission power of the user equipment; and a transmitting step of transmitting the transmission power control signal to the user equipment, wherein the transmission power control signal is generated by the transmission power control signal generating step. When the first determination step determines that the user equipment is performing the radio communication through the booster, the target SIR setting step sets the target SIR to be less than or equal to a predetermined upper limit value.

Effect of the Present Invention

According to the disclosed base station and the method, the cases can be reduced where the uplink signal to be transmitted by the booster would exceed the transmission output power of the booster.

BRIEF DESCRIPTION OF THE DRAWINGS

FIG. 6 is a diagram showing an example of a table which is used by the base station (eNodeB) according to the embodiment;

FIG. 9 is a diagram showing an example of a table used by the base station (eNodeB) according to the embodiment.

EMBODIMENTS FOR CARRYING OUT THE INVENTION

Next, there is explained a mode for carrying out the present invention by way of the following embodiment, while referring to the figures. In all the figures for explaining the embodiment, the same symbols are used for elements having the same functions, thereby omitting repeated explanations.

<Embodiment>
<System>

An environment is explained below. Here, a base station (eNodeB) according to the embodiment is applied to the environment.

The environment to which the base station (eNodeB) is applied may be an environment in which plural mobile communication systems coexist. The mobile communication systems include a mobile communication system based on the Evolved UTRA and UTRAN scheme. The mobile communication system based on the Evolved UTRAN and UTRAN scheme is also referred to as LTE. Further, a mobile communication system based on the W-CDMA scheme may be included. Additionally, a next generation mobile communication system may be included.

One or more cells are included in an area covered by the base station (eNodeB). The plural cells include cells in which radio communications can be performed at the same frequency band. The cells in which radio communications can be performed at the same frequency band may be referred to as a "frequency layer."

Figure 1:
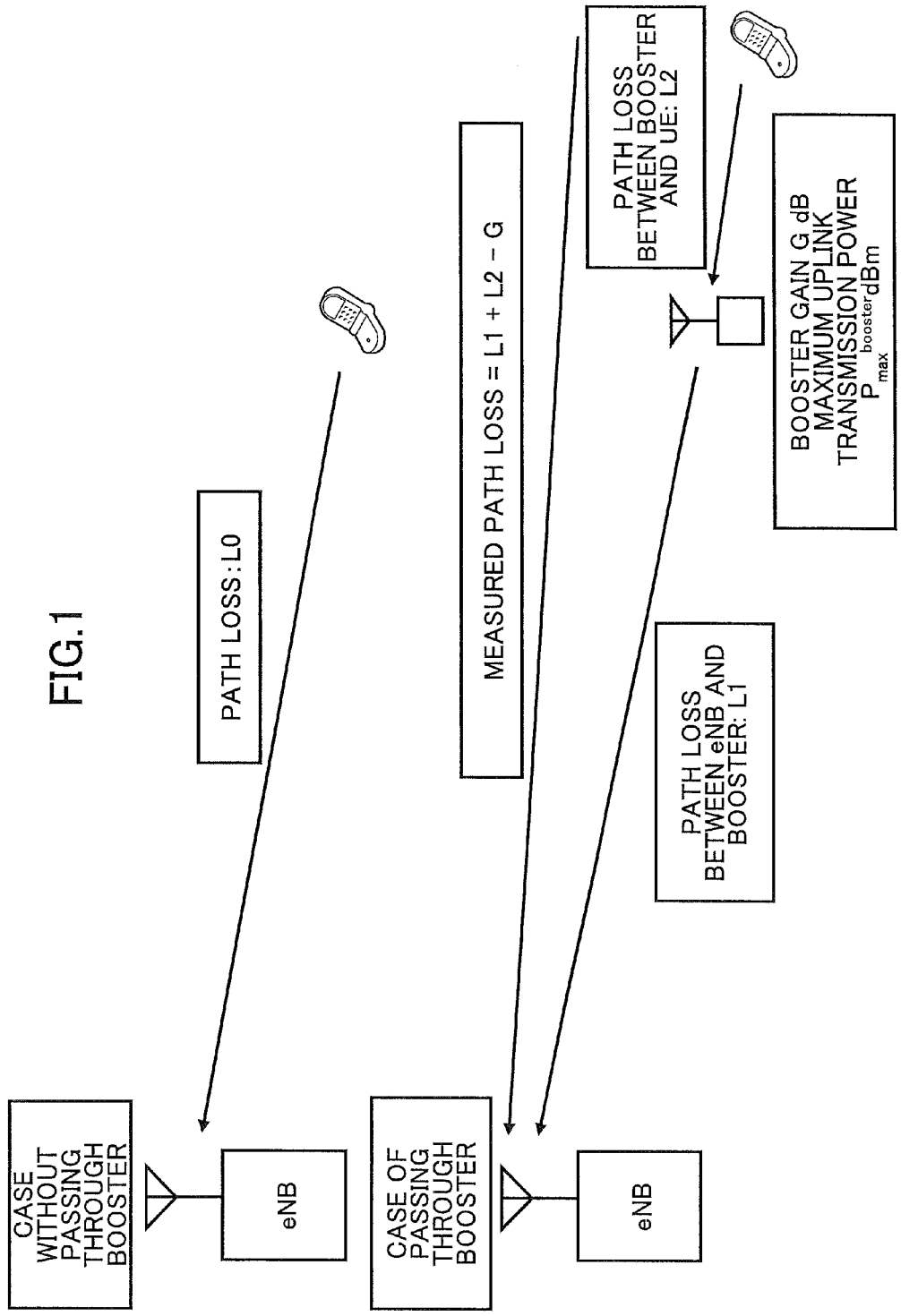
FIG. 1 is a diagram showing an example where radio communication is performed through a booster.
Figure 2:
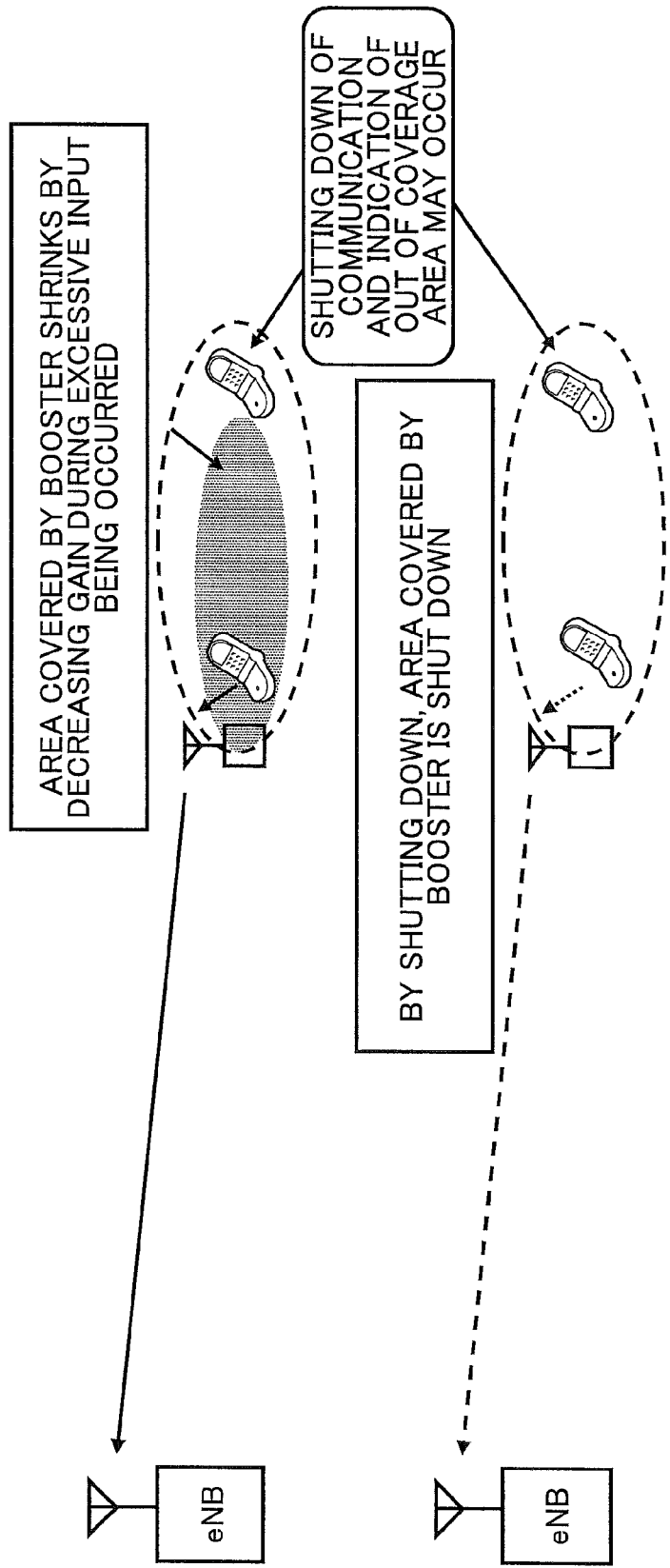
FIG. 2 is a diagram showing an example of problems that occur when the radio communication is performed through the booster.
Figure 3:
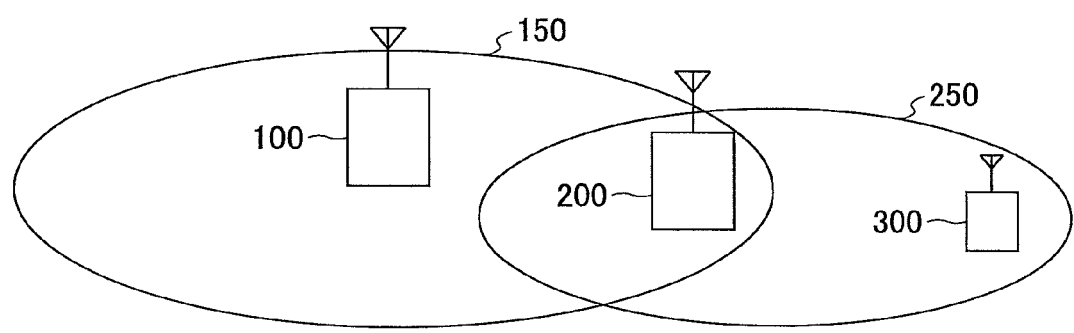
FIG. 3 is a diagram showing an example of a system according to an embodiment.

FIG. 3 is a schematic diagram showing an example of the environment to which the base station (eNodeB) 100 is applied. In FIG. 3, as an example, there are shown the base station (eNodeB) 100 according to the LTE scheme and an area covered by the base station (eNodeB) 100. The area may include a cell in which radio communication can be performed at a different frequency band. The different frequency band is different from the frequency band used for radio communication with user equipment. The area includes a cell 150 where radio communication with the user equipment is enabled. A booster 200 is installed in the area 150. From the viewpoint of increasing a coverage rate of the area where the radio communication by the base station (eNodeB) 100 is enabled, the location where the booster 200 is installed is preferably at an edge region of the area covered by the base station (eNodeB) 100. By installing the booster 200 at the edge region of the area covered by the base station (eNodeB) 100, the area covered by the base station (eNodeB) 100 can be enlarged.

In addition, when a distance between the base station (eNodeB) 100 and the booster 200 is large, it is expected that an uplink signal to be transmitted from the booster would exceed transmission output power.

The booster 200 covers an area 250. User equipment 300 is located in the area 250. The user equipment 300 can perform radio communication with the base station (eNodeB) 100 through the booster 200.

The booster 200 may include an outdoor booster, an indoor booster, and a home booster.

<Base Station (eNodeB)>

The base station (eNodeB) 100 is connected to a MME (not shown). The MME is connected to a core network (not shown). The base station (eNodeB) 100 covers the cell 150. The user equipment 300 performs communication with the base station (eNodeB) 100 based on the Evolved UTRA and UTRAN scheme. The MME may be achieved together with a serving gateway (SGW: Serving GateWay). The MME/S-GW may be referred to as an "access gateway." The base station (eNodeB) 100 may be connected to an evolved packet core (EPC: Evolved Packet Core) (not shown).

A single base station (eNodeB) may be connected to the MME/S-GW. Alternatively, plural base stations (eNodeBs) may be connected to the MME/S-GW.

<Transmission Power Control Method>

The base station (eNodeB) 100 performs transmission power control. For example, open loop transmission power control is utilized together with closed loop transmission power control. When the transmission power control is performed, the base station (eNodeB) 100 determines whether the user equipment 300 is performing radio communication through the booster 200. When the base station (eNodeB) 100 determines that the radio communication is performed through the booster 200, the base station (eNodeB) 100 controls the transmission power of the user equipment 300, so that an uplink signal to be transmitted by the booster 200 does not exceed the transmission output power of the booster.

Figure 4:
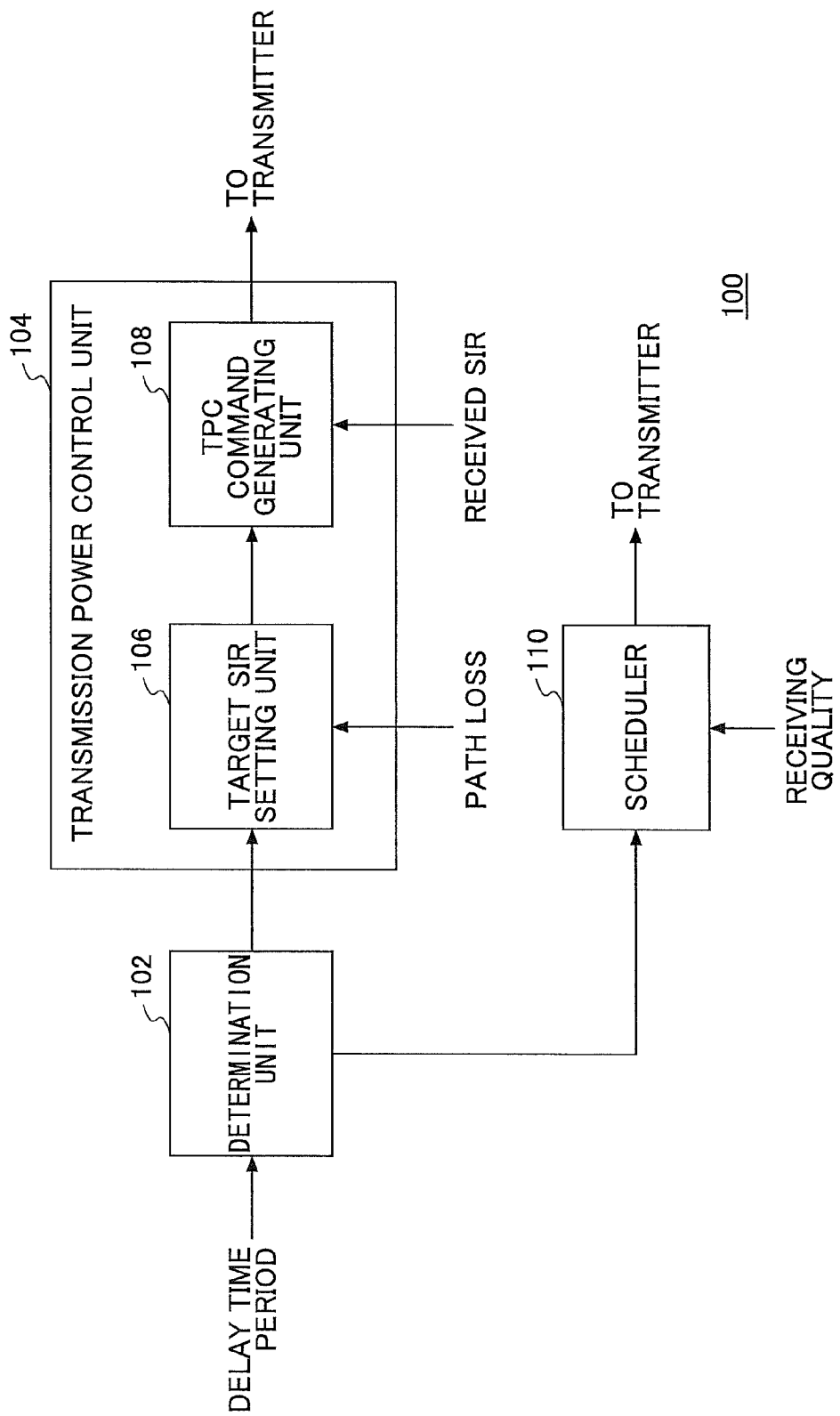
FIG. 4 is a functional block diagram showing a base station (eNodeB) according to the embodiment.

FIG. 4 shows the base station (eNodeB) 100.

The base station (eNodeB) 100 includes a determination unit 102.

The determination unit 102 determines whether the user equipment 300, which performs the radio communication with the base station (eNodeB) 100, is performing the radio communication through the booster 200.

<Determination Method of Whether the Radio Communication is Performed Through the Booster 200>

When the user equipment 300 and the base station (eNodeB) 100 perform radio communication with each other through the booster 200, receiving time of the uplink signal from the user equipment 300 is delayed, compared to a case where the radio communication is performed without passing through the booster 200. Namely, for a case where the radio communication is performed through the booster 200, a delay of the signal to be received by the base station (eNodeB) 100 becomes greater, compared to a case where the radio communication is performed without passing through the booster 200. That is because processing time in the device is added. The processing time in the device is for the booster 200 to receive and amplify the uplink signal from the user equipment 300.

The determination unit 102 determines whether the user equipment 300 is performing the radio communication through the booster 200, based on a delay time period of a signal to be transmitted by the user equipment 300. The base station (eNodeB) 100 performs time alignment with the user equipment 300. For example, during a radio access procedure, the time alignment is performed. A delay time period that is used during the time alignment may be utilized. Alternatively, a delay time period that is used for performing positioning by the user equipment 300 may be utilized. The user equipment 300 performs the positioning during communication.

When the delay time period is greater than or equal to a threshold value (hereinafter, which is referred to as the "delay time period threshold value"), the determination unit 102 determines that the user equipment 300 is performing the radio communication through the booster 200. Whereas, when the delay time period is less than the predetermined delay time period threshold value, the determination unit 102 determines that the radio communication is directly performed with the user equipment 300. The delay time period threshold value is determined in advance, based on the installed position of the booster 200 and the processing time of the booster 200 (reception processing time and amplification processing time). As the distance between the base station (eNodeB) 100 and the booster 200 becomes greater, greater transmission output power is required for the booster 200. Accordingly, a distance between the booster 200 and the base station (eNodeB) 100 can be determined, with which the shrinking of the area of the booster 200 and/or shutting down of the booster 200 occurs. The delay time period threshold value is obtained from this distance. Alternatively, the delay time period threshold value may be determined based on a delay time period of an uplink signal, which is transmitted by user equipment located at an edge of the cell 150 of the base station (eNodeB) 100.

The determination unit 102 inputs information to a target SIR setting unit 106 and a scheduler 110. Here, the information indicates whether the user equipment 300 is performing the radio communication through the booster 200.

The base station (eNodeB) 100 includes the target SIR setting unit 106. The target SIR setting unit 106 is connected to the determination unit 102. Further, a path loss is input to the target SIR setting unit 106.

For example, the path loss may be estimated based on power headroom reporting (PHR: Power Headroom Reporting). The user equipment 300 periodically reports the power headroom. The power headroom includes information representing a margin of power, namely, the power obtained by subtracting the actual transmission power from the maximum transmission power. The base station 100 can calculate the transmission power, which is controlled by the user equipment 300, from the power headroom.

Alternatively, for example, the path loss may be estimated from the transmission power. For example, the base station (eNodeB) 100 measures a reception level, and the base station (eNodeB) 100 estimates the path loss based on the reception level. In this case, a measurement error of the reception level is the estimation error of the path loss.

The base station (eNodeB) 100 may back-calculate it from the transmission power of the user equipment 300. The transmission power of the user equipment 300 is set in accordance with the path loss and adjustment based on a TPC command from the base station 100. Accordingly, the path loss can be back-calculated when the base station (eNodeB) 100 finds the adjustment of the TPC command. Since the path loss measured by the user equipment 300 is to be estimated, a downlink path loss is to be estimated. If the adjustment of the TPC command does not include an error, the estimated value of the path loss does not deviate.

The above-described path loss estimation methods are merely examples. The path loss may be estimated by another method.

The determination unit 102 inputs the information indicating whether the user equipment 300 is performing the radio communication to the target SIR setting unit 106.

The target SIR setting unit 106 sets the target SIR, based on the path loss. The base station (eNodeB) 100 uses the target SIR for adjusting the transmission power of the user equipment 300 based on the received SIR of the uplink signal from the user equipment 300. The base station (eNodeB) 100 compares the target SIR and the received SIR. The base station (eNodeB) 100 controls the transmission power, so that the received SIR becomes closer to the target SIR.

During the setting of the target SIR, when the information to be input by the determination unit 102 indicates that the user equipment 300 is performing the radio communication through the booster, the target SIR setting unit 106 sets an upper limit value of the target SIR, which is to be set. Namely, for a case where the target SIR calculated based on the path loss exceeds the upper limit value of the target SIR, the target SIR is set to be the upper limit value of the target SIR.

For example, the upper limit value of the target SIR is determined not to exceed the transmission output power of an uplink signal to be transmitted by the booster, based on an upper limit value of the transmission output power of the booster 200 and the location of the booster 200. The distance between the base station (eNodeB) 100 and the booster 200 is determined based on the location of the booster 200. Alternatively, for example, the upper limit value of the target SIR may be set in advance, based on the positions of the base station (eNodeB) 100, the booster 200, and the user equipment 300. For example, the path loss between the base station (eNodeB) 100 and the booster 200 is estimated based on the positions of the base station (eNodeB) 100 and the booster 200. Additionally, the path loss between the booster 200 and the user equipment 300 is estimated based on the position of the booster 200 and the position of the user equipment 300. Here, the position of the user equipment 300 is for a case where the user equipment 300 is assumed to be located at an edge of the area covered by the booster 200. The path loss between the base station (eNodeB) 100 and the user equipment 300 is estimated based on the two passlosses and the booster gain of the booster 200, and the upper limit value of the target SIR is determined based on the path loss.

The above-described methods of setting the upper limit value of the target SIR are merely examples. The upper limit value of the target SIR obtained by another method may be utilized.

The target SIR setting unit 106 inputs the target SIR, which is to be set, to a TPC command calculating unit 108.

The base station (eNodeB) 100 includes the TPC command generating unit 108. The TPC command generating unit 108 is connected to the target SIR setting unit 106. The received SIR is input to the TPC command generating unit 108. The received SIR may be measured based on the uplink signal from the user equipment 300.

For example, the base station (eNodeB) 100 measures the received SIR from a reference signal (RS: Reference Signal).

For example, the base station (eNodeB) 100 measures the received SIR from a reference signal (RS: Reference Signal). For example, the received SIR may be measured based on a demodulation reference signal included in a Physical Uplink Shared Channel (PUSCH: Physical Uplink Shared Channel).

The reference signal includes a sounding reference signal (SRS: Sounding Reference Signal). By measuring the received SIR based on the sounding reference signal, the received SIR can be periodically measured. That is because the SRS is periodically transmitted. Additionally, the received SIR can be measured across the whole frequency band. That is because the SRS is transmitted across the whole frequency band.

The above-described methods of measuring the received SIR are merely examples. The received SIR may be measured by another method.

The TPC command generating unit 108 generates a TPC command based on the target SIR and the received SIR. The target SIR is input from the target SIR setting unit 106. For example, when the received SIR is greater than or equal to the target SIR, the TPC command generating unit 108 generates a TPC command indicating that the transmission power is to be reduced. When the received SIR is less than the target SIR, the TPC command generating unit 108 generates a TPC command indicating that the transmission power is to be increased.

The TPC command generating unit 108 inputs the TPC command to a transmitter (not shown). The transmitter wirelessly transmits the TPC command to the user equipment 300 through the booster 200.

The base station 100 includes the scheduler 110. The scheduler 110 is connected to the determination unit 102. The determination unit 102 inputs the information indicating whether the user equipment 300 is performing the radio communication to the scheduler 110. Additionally, receiving quality to be transmitted by the user equipment 300 is input to the scheduler 110. The receiving quality includes the received SIR.

The scheduler 110 selects user equipment to which resource blocks (RB: Resource Block) are allocated, based on the receiving quality to be transmitted by the user equipment 300. During allocation of the resource blocks, when the information to be input by the determination unit 102 indicates that the user equipment 300 is performing the radio communication through the booster 200, the scheduler 110 regulates the number of the resource blocks to be allocated to the user equipment 300. For example, the number of the resource blocks to be allocated is decreased. Alternatively, an upper limit value of the number of the resource blocks to be allocated may be set. By regulating the number of the resource blocks to be allocated to the user equipment 300, the transmission power for the user equipment 300 to transmit the uplink signal can be reduced.

Further, for decreasing the number of the resource blocks, the scheduler 110 may decrease it in accordance with an order which is different from that of a neighboring cell. The order of decreasing the resource blocks may be set in advance in the base station (eNodeB) 100, so that the order is different from that of the neighboring cell. Alternatively, the order may be made different from that of the neighboring cell by making the base stations (eNodeBs) communicate with each other. For example, information regarding the resource blocks that may be utilized is reported from another cell. Based on the information reported from another cell regarding the resource blocks that may be utilized, resource blocks to be reduced may be determined to be the resource blocks that may be utilized, which are reported from the other cell. Alternatively, information regarding the resource blocks that are not utilized is reported from another cell. Based on the information reported from another cell regarding the resource blocks that are not utilized, resource blocks to be reduced may be determined to be resource blocks other than the resource blocks that are not utilized, which are reported from the other cell. By reducing the resource blocks in accordance with the order which is different from that of the neighboring cell, a probability can be increased such that the positions of the resource blocks after reducing the resource blocks are different from those of the neighboring cell. Accordingly, the inter-cell interference can be reduced.

<Operations of Base Station (eNodeB)>

Figure 5:
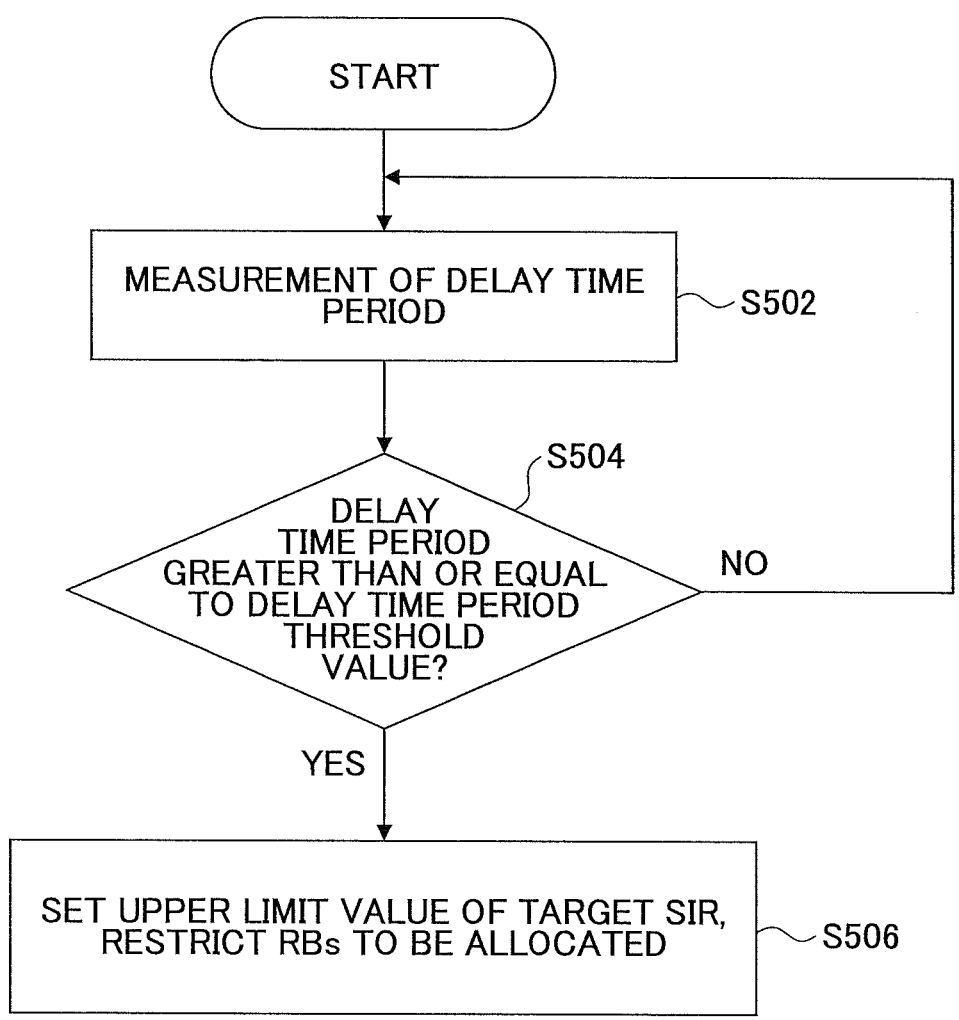
FIG. 5 is a flowchart showing an example of operations of the base station (eNodeB) according to the embodiment.

FIG. 5 is a flowchart showing operations of the base station (eNodeB) 100.

The base station (eNodeB) 100 measures the delay time period (step S502). For example, the delay time period that is used during the timing alignment may be utilized, or the delay time period that is used during the positioning by the user equipment 300 may be utilized. The timing alignment is performed at the start of the communication.

The base station 100 determines whether the delay time period is greater than or equal to the delay time period threshold value (step S504). For example, the determination unit 102 determines whether the delay time period is greater than or equal to the delay time period threshold value.

When the delay time period is determined to be greater than or equal to the delay time period threshold value (step S504: YES), the base station (eNodeB) 100 performs at least one of setting of the upper limit value of the target SIR and regulation of the resource blocks to be allocated to the user equipment 300 (step S506).

For example, when the determination unit 102 determines that the delay time period is greater than or equal to the delay time period threshold value, the target SIR setting unit 106 sets the upper limit value of the target SIR. Since the upper limit value of the target SIR is determined, the target SIR that is set by the target SIR setting unit 106 does not exceed the upper limit value of the target SIR. Since the target SIR that is set by the target SIR setting unit 106 does not exceed the upper limit value of the target SIR, the transmission power of the user equipment 300 controlled by the TPC command generated by the TCP command generating unit 108 is less than or equal to a predetermined value. Since the transmission power of the uplink signal transmitted by the user equipment 300 is less than or equal to the predetermined value, even if the signal is amplified by the booster 200, the transmission power of the signal does not exceed the transmission output power of the booster.

Further, for example, when the determination unit 102 determines that the delay time period is greater than or equal to the delay time period threshold value, the scheduler 110 regulates the number of the resource blocks to be allocated to the user equipment 300, where the delay time period is greater than or equal to the delay time period threshold value. Since the number of the resource blocks to be allocated is regulated, the transmission power to be set for the user equipment 300 to transmit the uplink signal can be reduced. Since the transmission power of the uplink signal transmitted by the user equipment 300 can be reduced, even if the uplink signal is amplified by the booster 200, a probability that the transmission power of the uplink signal exceeds the transmission output power of the booster device can be decreased.

Whereas, when the delay time period is determined to be less than the delay time period threshold value at step S504 (step S504: NO), the base station (eNodeB) 100 returns to step S502, without setting the upper limit value of the target SIR, and without regulating the resource blocks to be allocated to the user equipment 300. The user equipment 300 is performing the radio communication not through the booster 200. Accordingly, it is not necessary to set the upper limit value of the target SIR, and it is not necessary to regulate the number of the resource blocks to be allocated.

There are various types of booster devices, depending on purposes. The delay time period, the booster gain, and the maximum output power vary depending on the types of the boosters. For example, there are boosters that are used for outdoor environments, boosters that are used for indoor environments, and low-power boosters for house uses.

By taking into account that there are various types of boosters, plural delay time period classification values, plural target SIRs, and plural limiting values for the RBs to be allocated may be set. The delay time period classification values are values that are greater than or equal to the delay time period threshold value.

FIG. 6 shows an example of a relationship among the delay time period classification value, the target SIR, and the limiting value of the RBs to be allocated. For a case where the plural delay time period classification values are set, the target SIRs and the limiting values of the allocated RBs are determined, so as to correspond to the plural ranges indicated by the delay time period classification values. At step S504 of the flow explained by referring to FIG. 5, determination is made as to which range of the plural ranges indicated by the delay time period classification values shown in FIG. 6 corresponds to the delay time period. The target SIR and the limiting value of the RBs to be allocated corresponding to the relevant range are set. By setting the plural delay time period classification values, the optimum target SIR and the optimum limiting value of the RBs to be allocated are determined, depending on the type of the booster.

Further, when an interference level of the uplink is small, in majority of cases, the target SIR can be satisfied, even if the transmission power to be set for the user equipment 300 is small. Accordingly, a function may be included such that the delay time period threshold value, the target SIR, and the limiting value of the RBs to be allocated are adjusted, depending on the interference level of the uplink. Specifically, plural tables such as shown in FIG. 6 may be prepared, corresponding to the uplink interference levels.

According to the embodiment, the cases can be reduced where the uplink signal to be transmitted by the booster would exceed the transmission output power of the booster. Accordingly, it is possible to avoid the shrinking of the area that is caused when the booster decreases the booster gain. In addition, it is possible to avoid shutting down of the booster. Therefore, highly reliable service can be provided, even if the area is covered by the booster device.

<Modified Example>
<System>

An environment to which the base station (eNodeB) according to this modified example is applied is the same as the environment which is explained by referring to FIG. 3.

<Base Station (eNodeB)>

This base station (eNodeB) 100 is different from the base station (eNodeB) according to the above-described embodiment in the determination method of determining whether the user equipment 300 is performing the radio communication through the booster 200.

The base station (eNodeB) 100 determines whether the user equipment 300 is performing the radio communication through the booster 200, based on the path loss, in addition to the delay time period between the base station (eNodeB) 100 and the user equipment 300. By making the determination based on the path loss, in addition to the delay time period between the base station (eNodeB) 100 and the user equipment 300, the determination can be made more accurately, as to whether the user equipment 300 is performing the radio communication through the booster 200.

For user equipment located far away from the base station (eNodeB) 100, such as the user equipment located at the edge of the cell, in many cases, the delay time period is measured to be a large value, even though the user equipment is performing the radio communication not though the booster 200. When the delay time period is measured to be the large value, it is possible that erroneous determination is made such that the radio communication is performed through the booster 200.

Accordingly, the base station (eNodeB) 100 according to the modified example determines whether the user equipment 300 is performing the radio communication through the booster 200, based on the path loss, in addition to the delay time period. That is because, for the user equipment performing the radio communication through the booster 200, the path loss is measured to be smaller, compared to the user equipment performing the radio communication not through the booster 200. Specifically, when the path loss is less than a predetermined threshold value (hereinafter, which is referred to as the "path-loss threshold value"), the base station (eNodeB) 100 determines that the radio communication is performed through the booster 200. Whereas, when the path loss is greater than or equal to the path-loss threshold value, the base station (eNodeB) 100 determines that the radio communication is performed not through the booster 200. The path-loss threshold value is set in advance, depending on the installed position of the booster 200. As the distance between the base station (eNodeB) 100 and the booster 200 becomes greater, the path loss becomes greater. Thus, the distance between the booster 200 and the base station (eNodeB) 100 can be obtained, with which the shrinking of the area of the booster 200 and the shutting down of the booster 200 occur. The path-loss threshold value is obtained from the above-described distance. Alternatively, the path-loss threshold value may be set in advance, based on the path loss of the uplink signal transmitted by the user equipment, which is located at an edge of the cell 150 of the base station (eNodeB) 100. It may be set based on the processing time (the reception processing time, the amplification processing time) of the booster 200.

Namely, when the delay time period is less than the delay time period threshold value, the base station (eNodeB) 100 determines that the radio communication is performed not through the booster 200. Further, when the delay time period is greater than or equal to the delay time period threshold value, and when the path loss is greater than or equal to the path-loss threshold value, the base station (eNodeB) 100 determines that the radio communication is performed not through the booster 200. Further, when the delay time period is greater than or equal to the delay time period threshold value, and when the path loss is less than the path-loss threshold value, the base station (eNodeB) 100 determines that the radio communication is performed through the booster 200.

Figure 7:
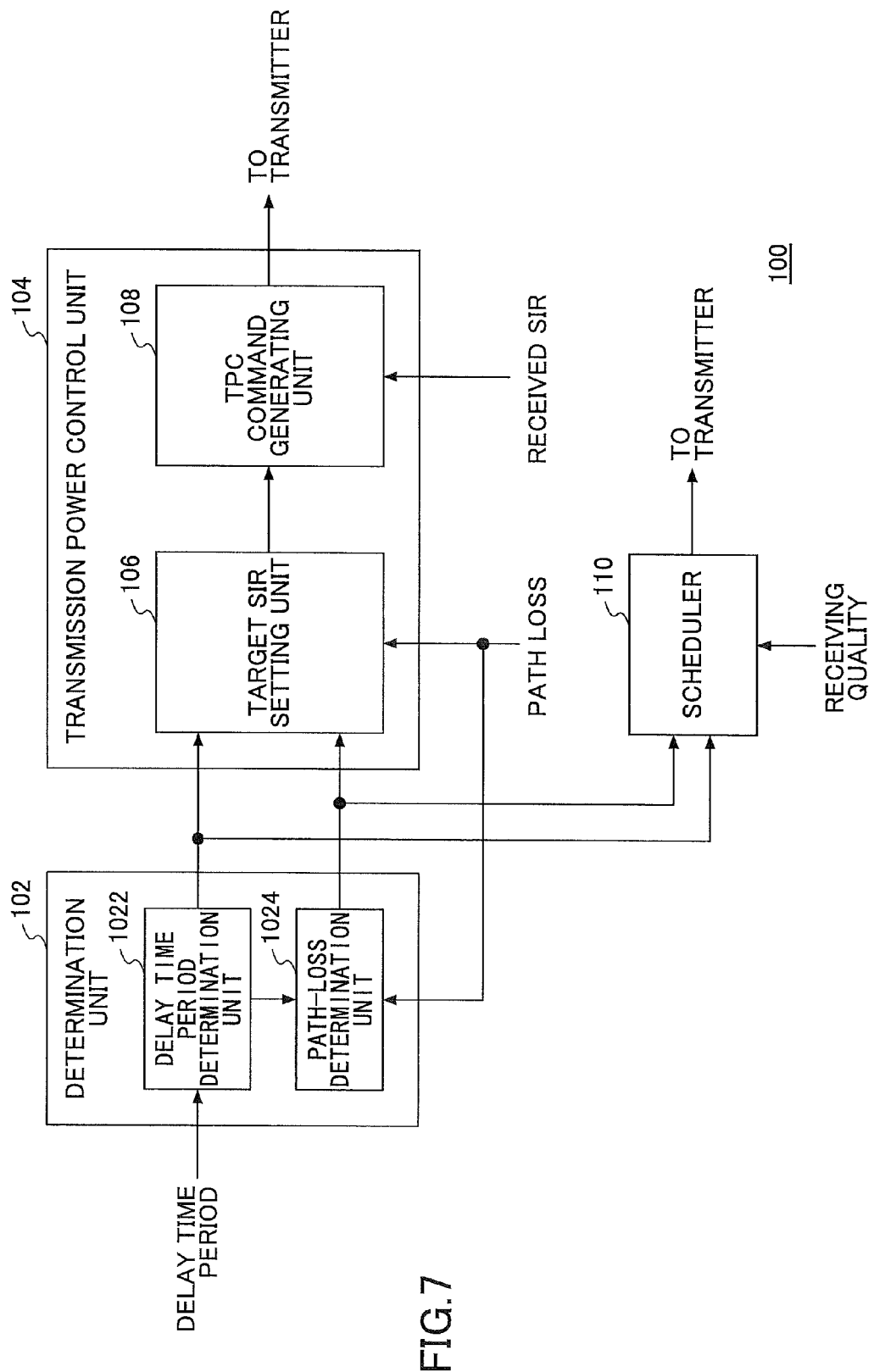
FIG. 7 is a functional block diagram showing the base station (eNodeB) according to the embodiment.

FIG. 7 shows the base station (eNodeB) 100.

The base station (eNodeB) 100 is the same as the base station (eNodeB) that is explained by referring to FIG. 4, except for the function of the determination unit.

The determination unit 102 includes a delay time period determination unit 1022. A delay time period is input to the delay time period determination unit 1022. The delay time period determination unit 1022 determines whether the input delay time period is greater than or equal to the delay time period threshold value.

When the delay time period is determined to be less than the delay time period threshold value, the determination is made such that the radio communication is performed with the user equipment 300 not through the booster 200. When the delay time period is determined to be greater than or equal to the delay time period threshold value, the determination is made such that the radio communication is performed with the user equipment 300 through the booster 200.

The delay time period determination unit 1022 inputs information to the target SIR setting unit 106 and to the scheduler 110. Here, the information indicates whether the radio communication is performed with the user equipment 300 through the booster 200 (hereinafter, which is referred to as the "primary determination information"). Further, the delay time period determination unit 1022 inputs the primary determination information to a path-loss determination unit 1024.

The determination unit 102 includes the path-loss determination unit 1024. The path-loss determination unit 1024 is connected to the delay time period determination unit 1022, the target SIR setting unit, and the scheduler 110. The path loss is input to the path-loss determination unit 1024. When the primary determination information input by the delay time period determination unit 1022 is the information indicating that the radio communication is performed with the user equipment 300 through the booster 200, the path-loss determination unit 1024 determines whether the path loss is greater than or equal to the path-loss threshold value.

When the path loss is less than the path-loss threshold value, the determination is made such that the radio communication is performed through the booster 200. When the path loss is greater than or equal to the path-loss threshold value, the determination is made such that the radio communication is performed not through the booster 200.

The path-loss determination unit inputs information to the target SIR setting unit 106 and to the scheduler 110. Here, the information indicates whether the radio communication is performed with the user equipment 300 through the booster 200 (hereinafter, which is referred to as the "secondary determination information").

The target SIR setting unit 106 sets the target SIR based on the path loss. When the primary determination information input by the delay time period determination unit 1022 is the information indicating that the radio communication is performed with the user equipment 300 through the booster 200, the target SIR setting unit 106 sets an upper limit value of the target SIR to be set. Whereas, when the primary determination information input by the delay time period determination unit 1022 is the information indicating that the radio communication is performed with the user equipment 300 not through the booster 200, the target SIR setting unit 106 does not set the upper limit value of the target SIR which is to be set.

Further, when the secondary determination information input by the path-loss determination unit 1024 is the information indicating that the radio communication is performed with the user equipment 300 through the booster 200, the target SIR setting unit 106 sets the upper limit value of the target SIR to be set. For example, the setting of the target SIR, which is already set, is maintained. Whereas, when the secondary determination information input by the path-loss determination unit 1024 is the information indicating that the radio communication is performed with the user equipment 300 not through the booster 200, the target SIR setting unit 106 releases the setting of the target SIR, which is already set.

The scheduler 110 selects user equipment to which the resource blocks are to be allocated, based on the receiving quality to be transmitted by the user equipment 300. For allocating the resource blocks, when the primary determination information input by the delay time determination unit 1022 is the information indicating that the radio communication is performed with the user equipment 300 through the booster 200, the scheduler 110 regulates the number of the resource blocks to be allocated to the user equipment 300. For example, the number of the resource blocks to be allocated is decreased. Alternatively, an upper limit value of the number of the resource blocks to be allocated may be set. Whereas, when the primary information input by the delay time determination unit 1022 is the information indicating that the radio communication is performed with the user equipment 300 not through the booster 200, the number of the resource blocks to be allocated to the user equipment 300 is not regulated.

Further, for decreasing the number of the resource blocks, the scheduler 110 may decrease it in accordance with an order which is different from that of the neighboring cell. The order of decreasing the resource blocks may be set in advance in the base station (eNodeB) 100, so that the order is different from that of the neighboring cell. Alternatively, the order may be made different from that of the neighboring cell, by making the base stations (eNodeBs) communicate with each other. For example, information regarding the resource blocks that may be utilized is reported from another cell. Based on the information reported from another cell regarding the resource blocks that may be utilized, resource blocks to be reduced may be determined to be the resource blocks that may be utilized, which are reported from the other cell. Alternatively, information regarding the resource blocks that are not utilized is reported from another cell. Based on the information reported from another cell regarding the resource blocks that are not utilized, resource blocks to be reduced may be determined to be resource blocks other than the resource blocks that are not utilized, which are reported from the other cell. By reducing the resource blocks in accordance with the order which is different from that of the neighboring cell, a probability can be increased such that the positions of the resource blocks after reducing the resource blocks are different from those of the neighboring cell. Accordingly, the inter-cell interference can be reduced.

Further, when the secondary determination information input from the path-loss determination unit 1024 is the information indicating that the radio communication is performed with the user equipment 300 through the booster 200, the scheduler 110 regulates the number of the resource blocks to be allocated to the user equipment 300. For example, the number of the resource blocks to be allocated is decreased. For example, the regulation on the number of the resource blocks to be allocated to the user equipment 300 is maintained. Whereas, when the secondary determination information input from the path-loss determination unit 1024 is the information indicating that the radio communication is performed with the user equipment 300 not through the booster 200, the target SIR setting unit 106 releases the regulation on the number of the resource blocks to be allocated to the user equipment 300.

<Operations of Base Station (eNodeB)>

Figure 8:
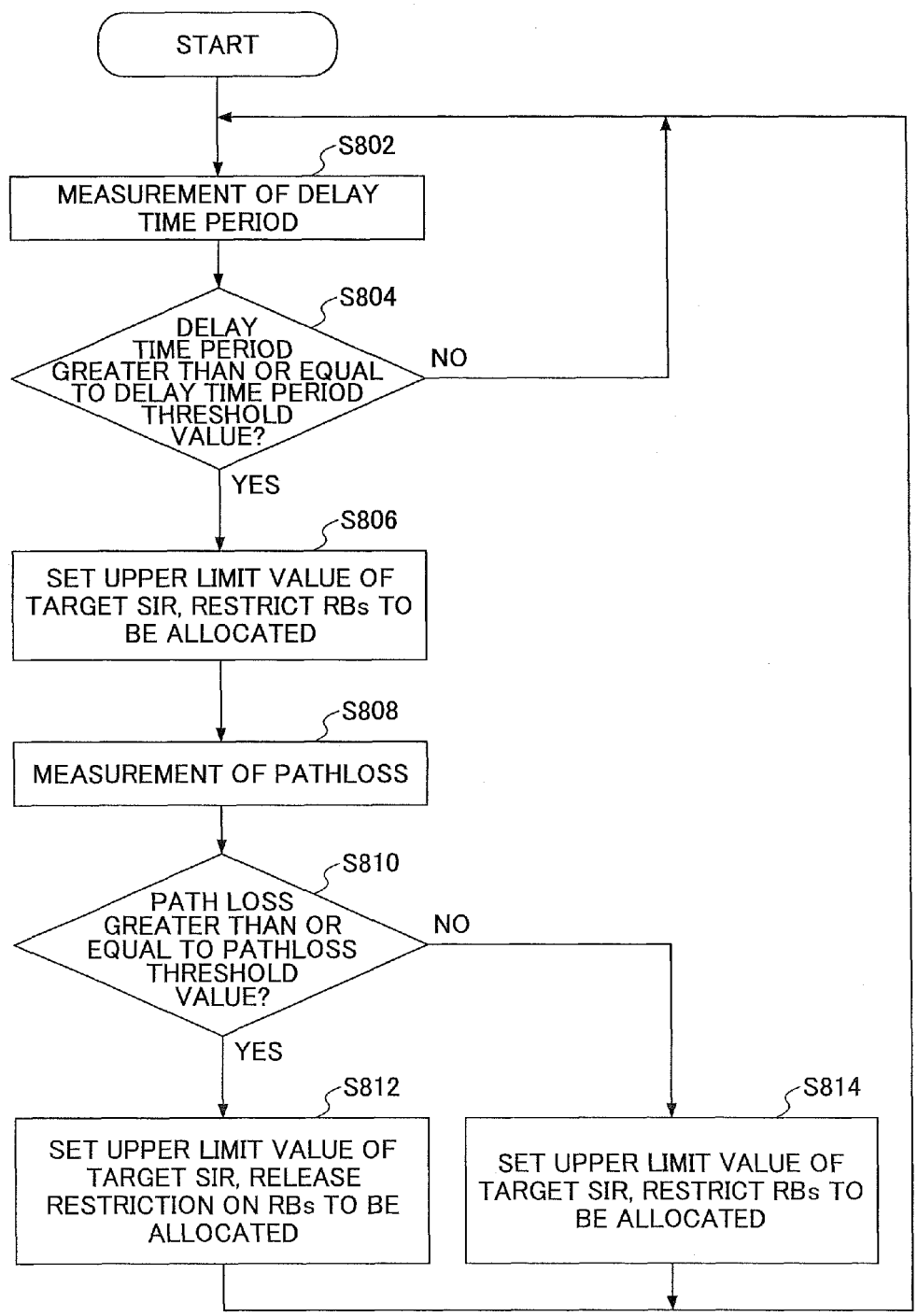
FIG. 8 is a flowchart showing an example of operations of the base station (eNodeB) according to the embodiment.

FIG. 8 is a flowchart showing operations of the base station (eNodeB) 100.

The base station (eNodeB) 100 measures a delay time period (step S802). For example, the delay time period used for the timing alignment may be utilized. Alternatively, the delay time period which is used for performing positioning by the user equipment 300 may be utilized. The timing alignment is performed at the start of the communication.

The base station (eNodeB) 100 determines whether the delay time period is greater than or equal to the delay time period threshold value (step S804). For example, the delay time period determination unit 1022 of the determination unit 102 determines whether the delay time period is greater than or equal to the delay time period threshold value.

When the delay time period is determined to be greater than or equal to the delay time period threshold value (Step S804: YES), the base station (eNodeB) 100 performs at least one of setting of the upper limit of the target SIR and regulation of the resource blocks to be allocated to the user equipment 300 (step S806).

For example, when the delay time determination unit 1022 of the determination unit 102 determines that the delay time period is greater than or equal to the delay time period threshold value, the target SIR setting unit 106 sets the upper limit value of the target SIR. Since the upper limit value of the target SIR is set, the target SIR which is set by the target SIR setting unit 106 does not exceed the upper limit value of the target SIR. Since the target SIR set by the target SIR setting unit 106 does not exceed the upper limit value of the target SIR, the transmission power of the user equipment 300 is less than or equal to a predetermined value. Here, the transmission power of the user equipment 300 is controlled by the TPC command, which is generated by the TPC command generating unit 108. Since the transmission power of the uplink signal transmitted by the user equipment 300 is less than or equal to the predetermined value, even if the signal is amplified by the booster 200, the transmission power of the signal does not exceed the transmission output power of the booster.

Further, when the delay time determination unit 1022 of the determination unit 102 determines that the delay time period is greater than or equal to the delay time period threshold value, for example, the scheduler 110 regulates the number of the resource blocks to be allocated to the user equipment 300, for which the delay time period is greater than or equal to the delay time period threshold value. Since the number of the resource blocks to be allocated is regulated, the transmission power can be decreased, which is to be set for transmitting the uplink signal by the user equipment 300. Since the transmission power of the uplink signal to be transmitted by the user equipment 300 can be decreased, even if the uplink signal is amplified by the booster 300, the probability can be decreased such that the transmission power of the uplink signal would exceed the transmission output power of the booster 200.

Whereas, when the delay time period is determined to be less than the delay time period threshold value at step S804 (step S804: NO), the base station (eNodeB) 100 returns to step S802, without setting the upper limit value of the target SIR, and without regulating the resource blocks to be allocated to the user equipment 300.

Subsequent to the setting of the upper limit value of the target SIR and the regulation of the RBs to be allocated at step S806, the base station (eNodeB) 100 measures the path loss (step S808).

The base station (eNodeB) 100 determines whether the path loss is greater than or equal to the path-loss threshold value (step S810). For example, the path-loss determination unit 1024 of the determination unit 102 determines whether the path loss is greater than or equal to the path-loss threshold value.

When the path loss is determined to be greater than or equal to the path-loss threshold value (step S810: YES), the base station (eNodeB) 100 releases the regulation on the resource blocks to be allocated to the user equipment 300 (step S812). That is because it is determined that the radio communication is performed with the user equipment 300 not through the booster 200. For example, the target SIR setting unit 105 releases the setting of the upper limit value of the target SIR. Further, the scheduler 110 releases the regulation on the resource blocks to be allocated to the user equipment 300.

Whereas, when the path loss is determined to be less than the path-loss threshold value at step S810 (step S810: NO), the base station (eNodeB) 100 maintains at least one of the setting of the upper limit value of the target SIR at step S806 and the regulation on the resource blocks to be allocated to the user equipment 300 (step S814).

After the processing of step S812 or step S814, the process returns to the step S802.

In the flowchart shown in FIG. 8, the setting of the upper limit value of the target SIR and the regulation of the number of the resource blocks to be allocated are performed based on the delay time period. That is because the delay time period can be measured at the start of the communication, but it takes a certain time period to measure the path loss. Namely, that is for preventing that, in the booster 200, the uplink signal to be transmitted would exceed the transmission output power of the booster, during the time period from the start of the communication until the execution of the measurement of the path loss.

The setting of the upper limit value and the regulation on the number of the resource blocks to be allocated may be performed after the determination is made, based on the delay time period and the path loss, as to whether the radio communication is performed with the user equipment 300 through the booster 200.

There are various types of booster devices, depending on purposes. The delay time period, the booster gain, and the maximum output power vary depending on the types of the boosters. For example, there are boosters that are used for outdoor environments, boosters that are used for indoor environments, and low-power boosters for house uses.

Similar to the above-described embodiment, by taking into account that there are various types of boosters, plural delay time period classification values, plural path-loss classification values, plural target SIRs, and plural limiting values for the RBs to be allocated may be set. The delay time period classification values are values that are greater than or equal to the delay time period threshold value. The path-loss classification values are values that are less than the path-loss threshold value.

FIG. 9 shows an example of a relationship among the delay time period classification value, the path-loss classification value, the target SIR, and the limiting value of the RBs to be allocated. For a case where the plural delay time period classification values and the plural path-loss classification values are set, the target SIRs and the limiting values of the RBs to be allocated are determined, so as to correspond to the plural ranges indicated by the delay time period classification values and the path-loss classification values. At step S804 of the flow explained by referring to FIG. 8, determination is made as to which range of the plural ranges indicated by the delay time period classification values shown in FIG. 6 corresponds to the delay time period. The target SIR and the limiting value of the RBs to be allocated corresponding to the relevant range are set. By setting the plural delay time period classification values, the optimum target SIR and the optimum limiting value of the RBs to be allocated are determined, depending on the type of the booster.

Further, at step S814 of the flow which is explained by referring to FIG. 8, determination is made as to which range of the plural ranges indicated by the delay time period classification values and the path-loss classification values shown in FIG. 9 corresponds to the delay time period and the path loss. The target SIR and the limiting value of the RBs to be allocated corresponding to the relevant range are set. By setting the plural delay time period classification values and the plural path-loss classification values, the optimum target SIR and the optimum limiting value of the RBs to be allocated are determined, depending on the type of the booster.

Further, when the interference level of the uplink is small, in many cases, the target SIR is satisfied, even if the transmission power to be set to the user equipment 300 is small. Accordingly, a function may be included such that the delay time period classification value, the path-loss classification value, the target SIR, and the limiting value of the RBs to be allocated are adjusted depending on the interference level of the uplink. Specifically, depending on the uplink interference level, plural tables such as shown in FIG. 9 may be prepared.

According to the modified example, the reliability can be improved for determining whether the user equipment is performing the radio communication through the booster.

Further, the cases can be decreased such that the uplink signal to be transmitted by the booster would exceed the transmission output power of the booster. Accordingly, the shrinking of the area caused by lowering the booster gain by the booster and the shutting down of the booster can be avoided. Therefore, a highly reliable service can be provided, even if the area is covered by the booster.

The base station (eNodeB) according to the embodiment is a base station (eNodeB) that performs radio communication with user equipment including a first determination unit that determines whether the user equipment is performing the radio communication through a booster, based on a delay time period of a signal transmitted to and received from the user equipment; a target SIR setting unit that sets a target SIR, the target SIR being to be compared to a received SIR for performing transmission power control based on the received SIR of an uplink signal from the user equipment; a transmission power control signal generating unit that functions as a TPC command generating unit that generates a transmission power control signal to be set for controlling transmission power of the user equipment based on the target SIR and the received SIR, the target SIR being set by the target SIR setting unit; and a transmitter that transmits the transmission power control signal to the user equipment, the transmission power control signal being generated by the transmission power control signal generating unit. When the first determination unit determines that the user equipment is performing the radio communication through the booster, the target SIR setting unit sets the target SIR to be less than or equal to a predetermined upper limit value.

The base station (eNodeB) may include a scheduler that selects user equipment to which resource blocks are to be allocated, based on receiving quality of a downlink. The scheduler may regulate a number of the resource blocks to be allocated to the user equipment, the user equipment being determined to be performing the radio communication through the booster by the first determination unit.

The base station (eNodeB) may have a configuration such that the base station (eNodeB) includes a second determination unit that functions as a path-loss determination unit that determines whether the user equipment is performing the radio communication through the booster based on a path loss that is measured based on the uplink signal from the user equipment, wherein, when the first determination unit determines that the user equipment is performing the radio communication through the booster, and when the second determination unit determines that the user equipment is performing the radio communication through the booster, the target SIR setting unit sets the target SIR to be less than or equal to the predetermined upper limit value.

The base station (eNodeB) may have a configuration such that, when the delay time period is greater than or equal to the delay time period threshold value, the first determination unit determines that the user equipment is performing the radio communication through the booster, wherein the delay time period threshold value is set based on a distance between the base station (eNodeB) and the booster, and a processing time period of the booster.

The base station (eNodeB) may have a configuration such that the base station (eNodeB) includes a table showing correspondences between plural ranges indicated by plural delay time classification values and the upper limit values of the target SIR, the plural delay time classification values being greater than or equal to the delay time period threshold value, wherein the first determination unit determines a range including the delay time period among the ranges indicated by the plural delay time classification values, and wherein the target SIR setting unit sets the target SIR corresponding to the rage determined by the first determination unit to be less than or equal to the upper limit value of the target SIR.

In the base station (eNodeB), when the path loss is less than or equal to a path-loss threshold value, the second determination unit may determine that the user equipment is performing the radio communication through the booster, and wherein the path-loss threshold value may be set based on the distance between the base station (eNodeB) and the booster.

The base station (eNodeB) may include a table showing correspondences between plural ranges indicated by plural path-loss classification values and the upper limit values of the target SIR, the plural path-loss classification values being less than the path-loss threshold value, wherein the second determination unit may determine a range including the path loss among the plural ranges indicated by the plural path-loss classification values, the plural ranges being included in the table, and wherein the target SIR setting unit may set the target SIR to be less than or equal to the upper limit value of the target SIR corresponding to the range determined by the second determination unit.

In the base station (eNodeB), the upper limit value of the target SIR may be set based on a transmission output power upper limit value of the booster and a distance to the booster.

The method according to the embodiment is a method of a base station (eNodeB) that performs radio communication with user equipment, the method including a first determination step of determining whether the user equipment is performing the radio communication through a booster, based on a delay time period of a signal transmitted to and received from the user equipment; a target SIR setting step of setting a target SIR, the target SIR being to be compared to a received SIR for performing transmission power control based on the received SIR of an uplink signal from the user equipment; a transmission power control signal generating step of generating a transmission power control signal to be set for controlling transmission power of the user equipment, based on the target SIR and the received SIR, the target SIR being set by the target SIR setting step; and a transmission step of transmitting the transmission power control signal to the user equipment, the transmission power control signal being generated by the transmission power control signal generating unit. When the first determination step determines that the user equipment is performing the radio communication through the booster, the target SIR setting step sets the target SIR to be less than or equal to a predetermined upper limit value.

The method may include a scheduling step of selecting user equipment to which resource blocks are to be allocated, based on receiving quality of a downlink. The scheduling step may regulate a number of the resource blocks to be allocated to the user equipment, wherein the first determination step determines that the user equipment is performing the radio communication through the booster.

The method may include a second determination step of determining whether the user equipment is performing the radio communication through the booster based on a path loss that is measured based on the uplink signal from the user equipment, wherein, when the first determination step determines that the user equipment is performing the radio communication through the booster, and when the second determination step determines that the user equipment is performing the radio communication through the booster, the target SIR may be set to be less than or equal to the predetermined upper limit value.

For convenience of the explanation, specific examples of numerical values are used in order to facilitate understanding of the invention. However, these numerical values are simply illustrative, and any other appropriate values may be used, except as indicated otherwise.

Hereinabove, the present invention is explained by referring to the specific embodiments. However, the embodiments are merely illustrative, and variations, modifications, alterations and substitutions could be conceived by those skilled in the art. For the convenience of explanation, the devices according to the embodiments of the present invention are explained by using functional block diagrams. However, these devices may be implemented in hardware, software, or combinations thereof. The present invention is not limited to the above-described embodiments, and various variations, modifications, alterations, substitutions and so on are included, without departing from the spirit of the present invention.

The present application claims priority based on Japanese Patent Application No. 2010-228872, filed on Oct. 8, 2010, the entire contents of which are hereby incorporated by reference.

LIST OF REFERENCE SYMBOLS

100: Base station (eNB: eNodeB)
102: Determination unit
1022: Delay time period determination unit
1024: Path-loss determination unit
104: Transmission power control unit
106: Target SIR setting unit
108: TPC (transmission power and rate control) command generating unit
110: Scheduler
150: Cell
200: Booster
250: Area covered by booster
300: User equipment

The invention claimed is:

1. A base station that performs radio communication with user equipment, the base station comprising;
a first determination unit that determines whether the user equipment is performing the radio communication through a booster, based on a delay time period of a signal transmitted to and received from the user equipment;
a target SIR setting unit that sets a target SIR, wherein the target SIR is to be compared to a received SIR for performing transmission power control based on the received SIR of an uplink signal from the user equipment;
a transmission power control signal generating unit that generates a transmission power control signal based on the target SIR and the received SIR, wherein the target SIR is set by the target SIR setting step, and the transmission power control signal is to be set for controlling transmission power of the user equipment; and
a transmitter that transmits the transmission power control signal to the user equipment, wherein the transmission power control signal is generated by the transmission power control signal generating unit,
wherein, when the first determination unit determines that the user equipment is performing the radio communication through the booster, the target SIR setting unit sets the target SIR to be less than or equal to a predetermined upper limit value.

2. The base station according to claim 1, further comprising:
a scheduler that selects the user equipment to which resource blocks are to be allocated, based on receiving quality of a downlink,
wherein the scheduler regulates a number of the resource blocks to be allocated to the user equipment, the user equipment being determined to be performing the radio communication through the booster by the first determination unit.

3. The base station according to claim 1, further comprising:
a second determination unit that determines whether the user equipment is performing the radio communication through the booster based on a path loss that is measured based on the uplink signal from the user equipment,
wherein, when the first determination unit determines that the user equipment is performing the radio communication through the booster, and when the second determination unit determines that the user equipment is performing the radio communication through the booster, the target SIR setting unit sets the target SIR to be less than or equal to the predetermined upper limit value.

4. The base station according to claim 1,
wherein, when the delay time period is greater than or equal to a delay time period threshold value, the first determination unit determines that the user equipment is performing the radio communication through the booster, and
wherein the delay time period threshold value is set based on a distance between the base station and the booster, and a processing time period of the booster.

5. The base station according to claim 4, further comprising:
a table showing correspondences between plural ranges indicated by plural delay time classification values and the upper limit values of the target SIR, the plural delay time classification values being greater than or equal to the delay time period threshold value,
wherein the first determination unit determines a range including the delay time period among the ranges indicated by the plural delay time classification values, and
wherein the target SIR setting unit sets the target SIR corresponding to the range determined by the first determination unit to be less than or equal to the upper limit value of the target SIR.

6. The base station according to claim 3,
wherein, when the path loss is less than or equal to a path-loss threshold value, the second determination unit determines that the user equipment is performing the radio communication through the booster, and
wherein the path-loss threshold value is set based on a distance between the base station and the booster.

7. The base station according to claim 6, further comprising:
a table showing correspondences between plural ranges indicated by plural path-loss classification values and the upper limit values of the target SIR, the plural path-loss classification values being less than the path-loss threshold value,
wherein the second determination unit determines a range including the path loss among the plural ranges indicated by the plural path-loss classification values, the plural ranges being included in the table, and wherein the target SIR setting unit sets the target SIR to be less than or equal to the upper limit value of the target SIR corresponding to the range determined by the second determination unit.

8. The base station according to claim 1,
wherein the upper limit value of the target SIR is set based on a transmission output power upper limit value of the booster and a distance to the booster.

9. A method of a base station that performs radio communication with user equipment, the method comprising:
a first determination step of determining whether the user equipment is performing the radio communication through a booster, based on a delay time period of a signal transmitted to and received from the user equipment;
a target SIR setting step of setting a target SIR, wherein the target SIR is to be compared to a received SIR for performing transmission power control based on the received SIR of an uplink signal from the user equipment;
a transmission power control signal generating step of generating a transmission power control signal based on the target SIR and the received SIR, wherein the target SIR is set by the target SIR setting step, and the transmission power control signal is to be set for controlling transmission power of the user equipment; and
a transmission step of transmitting the transmission power control signal to the user equipment, wherein the transmission power control signal is generated by the transmission power control signal generating unit,
wherein, when the first determination step determines that the user equipment is performing the radio communication through the booster, the target SIR setting step sets the target SIR to be less than or equal to a predetermined upper limit value.

10. The method according to claim 9, further comprising:
a scheduling step of selecting user equipment to which resource blocks are to be allocated, based on receiving quality of a downlink,
wherein the scheduling step regulates a number of the resource blocks to be allocated to the user equipment, wherein the user equipment is determined to be performing the radio communication through the booster.

11. The method according to claim 9, further comprising:
a second determination step of determining whether the user equipment is performing the radio communication through the booster based on a path loss, wherein the path loss is measured based on the uplink signal from the user equipment,
wherein, when the first determination step determines that the user equipment is performing the radio communication through the booster, and when the second determination step determines that the user equipment is performing the radio communication through the booster, the target SIR setting step sets the target SIR to be less than or equal to the predetermined upper limit value.

* * * * *